United States Patent
Lee et al.

(10) Patent No.: US 9,694,820 B2
(45) Date of Patent: Jul. 4, 2017

(54) SSC CONTROL METHOD AND CONTROL APPARATUS THEREOF

(71) Applicant: HYUNDAI MOTOR COMPANY, Seoul (KR)

(72) Inventors: Hyung-Ju Lee, Yongin-si (KR); Kyu-Jin Jo, Daejeon (KR); Seong-Kyu Park, Suwon-si (KR); Jae-Woong Yoo, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 27 days.

(21) Appl. No.: 14/880,141

(22) Filed: Oct. 9, 2015

(65) Prior Publication Data

US 2016/0167657 A1 Jun. 16, 2016

(30) Foreign Application Priority Data

Dec. 11, 2014 (KR) ........................ 10-2014-0178173

(51) Int. Cl.
| | |
|---|---|
| B60W 10/02 | (2006.01) |
| B60W 10/06 | (2006.01) |
| B60W 30/18 | (2012.01) |
| B60W 50/00 | (2006.01) |
| G01C 21/34 | (2006.01) |

(52) U.S. Cl.
CPC ...... *B60W 30/18018* (2013.01); *B60W 10/02* (2013.01); *B60W 10/06* (2013.01); *B60W 30/18072* (2013.01); *B60W 50/0097* (2013.01); *B60W 2030/1809* (2013.01); *B60W 2550/146* (2013.01); *B60W 2550/402* (2013.01); *G01C 21/3469* (2013.01)

(58) Field of Classification Search
None
See application file for complete search history.

(56) References Cited

U.S. PATENT DOCUMENTS

| | | | | |
|---|---|---|---|---|
| 2012/0046841 | A1* | 2/2012 | Wurthner | ............ B60W 10/02 701/54 |
| 2013/0131948 | A1 | 5/2013 | Iwao et al. | |

(Continued)

FOREIGN PATENT DOCUMENTS

| | | |
|---|---|---|
| JP | 2010-013042 A | 1/2010 |
| JP | 2012-047148 A | 3/2012 |
| KR | 10-1394146 B1 | 5/2014 |

(Continued)

*Primary Examiner* — Edwin A Young
(74) *Attorney, Agent, or Firm* — McDermott Will & Emery LLP

(57) ABSTRACT

A SSC control method includes a condition satisfaction determination step of determining whether a vehicle can coast and a navigation information acquisition step of obtaining forward road information regarding a road section ahead of a current vehicle position when it is determined, in the condition satisfaction determination step, that the vehicle can coast. The method further includes a forward quick turn section determination step of determining whether a quick turn section exists in the road section ahead by using the forward road information obtained in the navigation information acquisition step, and an SSC entry step of controlling the vehicle to coast when it is determined in the forward quick turn section determination step that the quick turn section does not exist in the road section ahead.

10 Claims, 3 Drawing Sheets

(56) References Cited

U.S. PATENT DOCUMENTS

2013/0190998 A1* 7/2013 Polimeno .............. B60W 10/02
  701/68
2014/0114553 A1* 4/2014 Abdul-Rasool ....... B60W 10/02
  701/110

FOREIGN PATENT DOCUMENTS

KR  10-1428184 B1  8/2014
WO  2013/093962 A1  6/2013

* cited by examiner

SSC CONTROL METHOD AND CONTROL APPARATUS THEREOF

CROSS-REFERENCE TO RELATED APPLICATION

This application claims priority to Korean Patent Application No. 10-2014-0178173, filed on Dec. 11, 2014, the entire contents of which is incorporated herein by reference.

TECHNICAL FIELD

The present invention relates to a Start/Stop Coasting (SSC) control method and a control apparatus thereof, and more particularly, to a SSC control apparatus and method that includes obtaining information regarding a road section ahead and controlling a coasting function based on whether or not a quick turn section exists in the road section ahead.

BACKGROUND

Recently, it has been very important to improve fuel efficiency when a vehicle is driving on actual road since consumer complaints have increased due to the difference between authorized fuel efficiency and actual road-driving fuel efficiency. Therefore, the automobile industry has studied and developed the technology that maximizes the fuel efficiency by using driving conditions of a driver, around traffic situations and road information, etc. during a vehicle is driving on actual road as well as controls a vehicle system.

As examples, the technology searching and guiding an economical driving route by utilizing IT (Information Technology) and traffic information, the technology guiding effective fuel efficiency driving by memorizing slope information of running road and past running patterns, the technology controlling charging/discharging of a battery according to the level of SOC (State Of Charge) of the battery by predicting and determining road slope and traffic information, the technology controlling driving modes selectively in order for the fuel consumption to be minimized based on destination route and traffic information by using Map information DB (Data Base) have been studied and developed.

As stated above, as one technology among the technologies maximizing the fuel efficiency, there is Start/Stop Coasting (SSC). FIGS. 1A and 1B are drawings explaining SSC. Referring to FIG. 1A, SSC is a technology that cuts off fuel supply (Fuel Cut) and blocks the power transmission of a transmission during coasting (Clutch Off). According to this, an engine drag torque is blocked so that a driving distance may be increased compared to the conventional vehicle that does not have SSC capabilities (refer to FIG. 1B).

In the prior art, however, there is only the function recognizing present driving states as entry requirements of SSC but not recognizing driving conditions of road sections ahead of the current position of the vehicle. Accordingly, the SSC is applied when a driver does not step on an accelerator pedal before entering into quick turning road, and the SSC is released when the driver steps on a brake pedal in order to decelerate a vehicle after entering into the quick turning road. As stated above, since the SSC is frequently applied in the prior art, there is the problem that the durability of the components associated to the SSC is falling.

SUMMARY

The present invention has been made in an effort to solve the above problem and an object of the present invention is to provide a SSC control method based on whether the vehicle will need to turn quickly and a control apparatus thereof able to determine in advance whether a vehicle will need to turn quickly or not, or whether driving conditions render SSC entry unnecessary, thereby having the capability of preventing unnecessary SSC entry.

A SSC control method according to an exemplary embodiment of the present invention may include a condition satisfaction determination step of determining whether a vehicle can coast, a navigation information acquisition step of obtaining forward road information regarding a road section ahead of a current vehicle position when it is determined, in the condition satisfaction determination step, that the vehicle can coast, a forward quick turn section determination step of determining whether quick turn section exists in the road section ahead by using the forward road information obtained in the navigation information acquisition step, and an SSC entry step of controlling the vehicle to coast when it is determined in the forward quick turn section determination step that the quick turn section does not exist in the road section ahead.

In certain embodiments, the SSC entry step may include blocking fuel injection to an engine or blocking engine power transmission to a transmission by releasing a clutch.

In certain embodiments, the SSC control method may further include an SSC release step of self-driving using engine power when it is determined in the forward quick turn section determination step that the quick turn section exists in the road section ahead.

In certain embodiments, the SSC release step may include resuming engine fuel injection or transmitting the engine power to the transmission by engaging the clutch.

In certain embodiments, the the SSC release step may be executed when it is determined in the condition satisfaction determination step that SSC entry conditions are not satisfied.

In certain embodiments, the condition satisfaction determination step may include one or more of the following steps: determining whether an accelerator pedal is not operated; determining whether a brake pedal is not operated; determining whether a current vehicle speed is more than a reference vehicle speed; determining whether a road angle is above a reference road slope; and determining whether a steering angle is smaller than a reference steering angle. In certain embodiments, the navigation information acquisition step may include obtaining turn angle information every 10 meters forward of the current vehicle position.

In certain embodiments, the navigation information acquisition step may include obtaining turn angle information within 500 meters forward of the current vehicle position.

In certain embodiments, the forward quick turn section determination step may include determining whether a turn angle of road in a set forward distance is greater than a reference turn angle.

An SSC control apparatus in accordance with an exemplary embodiment of the present invention may include a navigation system configured to acquire turn angle information of road in a preset forward distance, an engine, a transmission configured to transmit or block the power of the engine to the wheels, and an ECU (Electronic Control Unit) configured to obtain a turn angle from the navigation system, determine whether the turn angle obtained from the navigation system is greater than a reference turn angle, and control the engine and the transmission accordingly. The engine may be configured to be stopped or restarted by the ECU.

According to embodiments of the present invention, drivability and durability of the components associated with the SSC may be improved by preventing frequent SSC entry, as described above.

DETAILED DESCRIPTION

Figure 1A:
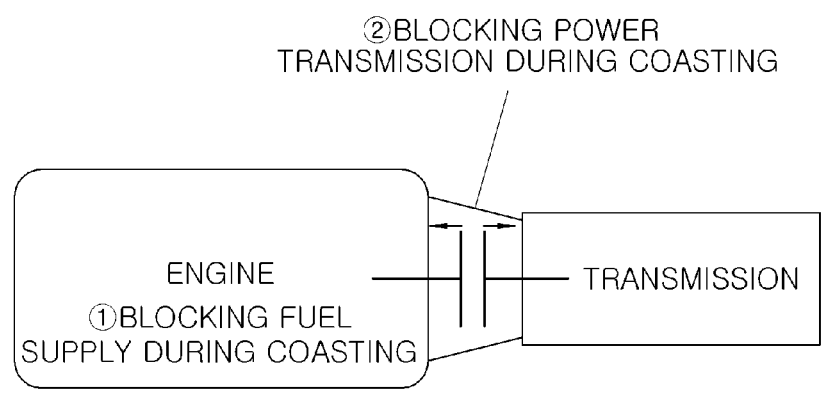
FIGS. 1A and 1B are diagrams illustrating Start/Stop Coasting (SSC).
Figure 1B:
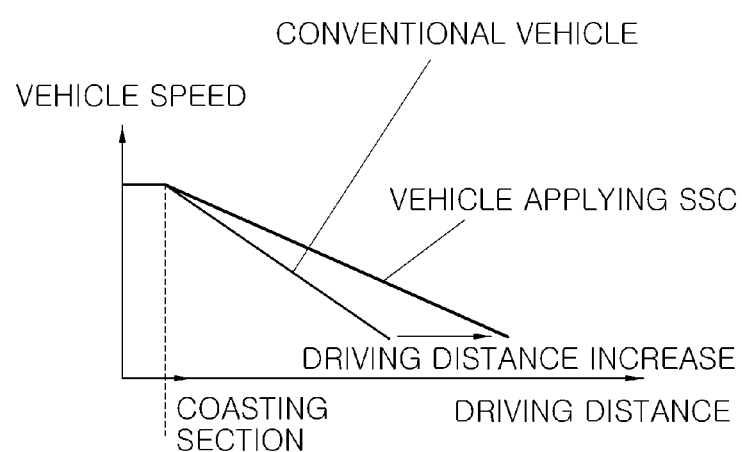

A word and term used in this specification and claim scope should not be limited to a typical or dictionary meaning and should rather be interpreted as the meaning and concept in compliance with the technological thought of this invention based on the principle that an inventor may define the concept of a term properly in order to explain his/her own invention in the best way. Thus, as used in the specification or claims, the term "forward distance" indicates a distance in the forward direction of the vehicle. The term "forward road" indicates a road section ahead of the vehicle in the forward direction of the vehicle. "Forward road information" indicates information regarding the forward road.

Because the exemplary embodiment written in this specification and the configuration illustrated in the drawings are no more than an embodiment of the present invention and do not represent all of technological thought in the present invention, it should be understood that there can be various equivalents and transformation examples to replace these at the time of this application. In addition, a detailed description about the well known function and configuration which may obscure the gist of the present invention unnecessarily may be omitted. Hereinafter, a desirable exemplary embodiment in the present invention may be described in detail with reference to the attached drawings.

Figure 2:
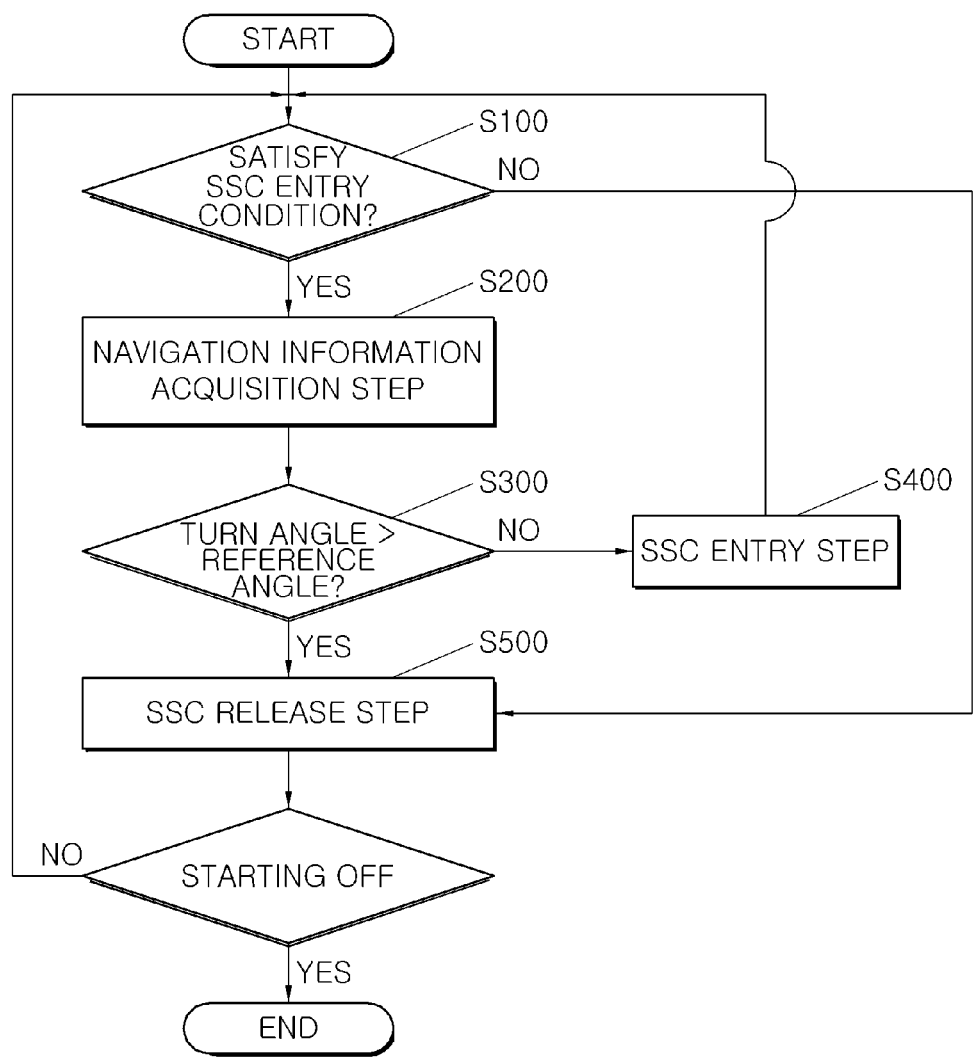
FIG. 2 is a flow chart of a SSC control method according to whether to turn quickly in accordance with an exemplary embodiment of the present invention.

FIG. 2 is a flow chart of an SSC control method in accordance with an exemplary embodiment of the present invention. Referring to FIG. 2, a SSC control method in accordance with an exemplary embodiment of the present invention may include an condition satisfaction determination step (S100), a navigation information acquisition step (S200), a forward quick turn section determination step (S300) and an SSC entry step (S400). In certain embodiments, the SSC control method shown in FIG. 2 takes into consideration whether upcoming road conditions may require that the vehicle turn quickly The condition satisfaction determination step (S100) is a step of determining whether a vehicle can coast. In certain embodiments, the condition satisfaction determination step (S100) may include determining whether any one or more of the following conditions are satisfied: whether an accelerator pedal is not operated; whether a brake pedal is not operated; whether a current vehicle speed is more than a reference vehicle speed; whether the slope of the vehicle is more than a reference slope angle; and whether a steering angle of the vehicle is less than a reference steering angle. That is, in certain embodiments, it is to determine preferentially whether the driving states of the current vehicle satisfy SSC entry conditions.

The navigation information acquisition step (S200) is a step of obtaining forward road information based on current vehicle position when it is determined that the vehicle can coast in the condition satisfaction determination step (S100). That is, it is to obtain the forward road information by using a navigation in order to recognize in advance driving direction road when it is determined that current vehicle driving states satisfy the SSC entry conditions in the condition satisfaction determination step (S100). In certain embodiments, the navigation information acquisition step (S200) may include obtaining turn angle information every forward 10 meters based on the current vehicle position and may obtain the turn angle information within forward 500 meters. That is, in certain embodiments, it is to obtain a total of 50 data entries of turn angle information in the driving direction road.

The forward quick turn section determination step (S300) is a step of determining whether quick turn section exists in the road ahead by using the forward road information obtained in the navigation information acquisition step (S200). The forward quick turn section determination step (S300) may include determining whether a turn angle of road in a set forward distance according to the road information obtained in the navigation information acquisition step (S200) is over a reference turn angle. The set distance and the reference angle may be set differently according to the type of vehicle, the vehicle speed and the vehicle weight, and so on. For example, if the set distance is assumed to be 100 m and the reference turn angle to be 90°, it is determined that quick turn section exists in the road ahead when the turn angle of the road is 120° at the forward 100 m among the road information obtained in the navigation information acquisition step (S200). In this example, it is, however, determined that quick turn section does not exist in the forward road when the turn angle of the road is 80° at the forward 100 m among the road information obtained in the navigation information acquisition step (S200). In certain embodiments, the turn angle means an angle rotating in the circumference direction around a certain place.

The SSC entry step (S400) is a step of controlling the vehicle to coast when it is determined in the forward quick turn section determination step (S300) that the quick turn section does not exist in the road ahead. In certain embodiments, the SSC entry step (S400) may include blocking fuel injection to an engine or blocking engine power transmission to a transmission by releasing a clutch. In certain embodiments, the SSC entry step (S400) may include both blocking fuel injection to an engine and blocking engine power transmission to a transmission by releasing a clutch. Thus, the fuel supply to the engine of the vehicle may be cut off (Fuel Cut) and the power transmission to the transmission may be blocked (Clutch Off) so that an engine drag torque is blocked, thereby increasing a driving distance.

In certain embodiments, the SSC control method according to whether to turn quickly in accordance with an exemplary embodiment of the present invention may further include a SSC release step (S500). In certain embodiments, the SSC release step (S500) is a step of self-driving using the engine power when it is determined that the quick turn section exists in the forward road in the forward quick turn section determination step (S300). In certain embodiments, the SSC release step (S500) may include resuming engine fuel injection, transmitting an engine power to the transmission by engaging the clutch, or both resuming engine fuel injection and transmitting engine power to the transmission by engaging the clutch. Furthermore, in certain embodiments, the SSC release step may also be executed when it is determined that the SSC entry conditions are not satisfied at the condition satisfaction determination step (S100). That is, in those embodiments, in the SSC release step (S500), the vehicle does self-driving by using the engine power without entering into the SSC from the beginning, or resuming the engine fuel injection and engaging a clutch to the transmission when the quick turn section exists after entering into the SSC.

As stated above, the present invention determines whether or not the vehicle will turn quickly or whether driving conditions render SSC entry unnecessary, thereby preventing unnecessary SSC entry. Thus, the drivability of the vehicle and durability of the components associated with the SSC may be improved by preventing frequent SSC entry.

Figure 3:
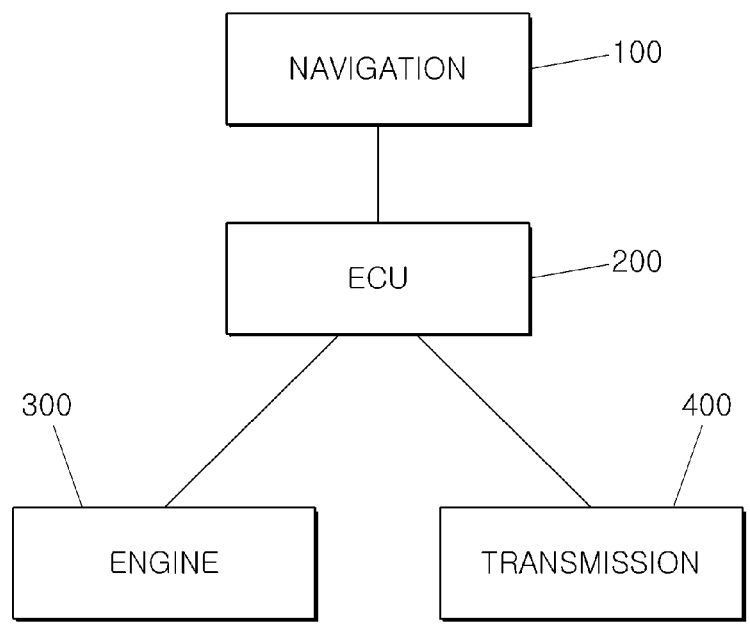
FIG. 3 is a block diagram of a SSC control apparatus according to whether to turn quickly in accordance with another exemplary embodiment of the present invention.

FIG. 3 is a block diagram of a SSC control apparatus in accordance with another exemplary embodiment of the present invention. In certain embodiments, the SSC control apparatus shown in FIG. 3 is configured to take into consideration whether upcoming road conditions may require that the vehicle turn quickly. Referring to FIG. 3, the SSC control apparatus in accordance with another exemplary embodiment of the present invention may include a navigation system 100, an ECU (Electronic Control Unit) 200, an engine 300 and a transmission 400.

The navigation system 100 may play a role of acquiring turn angle information of road at a set forward distance. The ECU 200 may determine whether the turn angle obtained in the navigation system 100 is greater than a reference angle and according to the determination result thereof, may control the engine 300 and the transmission 400. The engine may be stopped or restarted by the control of the ECU 200. The transmission 400 may play a role of transmitting the power of the engine 300 to wheels or blocking it.

The exemplary embodiment as discussed previously is merely a desirable embodiment which may enable a person (hereinafter referred to as 'a skilled person in the relevant technology'), who has a typical knowledge in a technology field that the present invention belongs to, to execute embodiments of the present invention easily, but the invention is not limited to the aforesaid exemplary embodiment and the attached drawings. Hence this does not result in limiting the scope of right in this invention. Therefore, it will be apparent to a skilled person in the relevant technology that several transposition, transformation, and change is possible within a scope of not deviating from the technological thought in the present invention and it is obvious that a easily changeable part by a skilled person in the relevant technology is included within the scope of right in the present invention as well.

What is claimed is:

1. A Start/Stop Coasting (SSC) control method comprising:
   a condition satisfaction determination step of determining whether a vehicle can coast,
   a navigation information acquisition step of obtaining forward road information regarding a road section ahead of a current vehicle position when it is determined, in the condition satisfaction determination step, that the vehicle can coast,
   a forward sudden turn section determination step of determining whether a sudden turn section exists in the road section ahead by using the forward road information obtained in the navigation information acquisition step, and
   an SSC entry step of controlling the vehicle to coast when it is determined in the forward sudden turn section determination step that the sudden turn section does not exist in the road section ahead.

2. The SSC control method of claim 1, wherein the SSC entry step includes: blocking fuel injection to an engine; or blocking engine power transmission to a transmission by releasing a clutch.

3. The SSC control method of claim 1, further comprising an SSC release step of self-driving using engine power when it is determined in the forward sudden turn section determination step that the sudden turn section exists in the road section ahead.

4. The SSC control method of claim 3, wherein the SSC release step comprises resuming engine fuel injection or transmitting the engine power to a transmission by engaging a clutch.

5. The SSC control method of claim 3, wherein the SSC release step is executed when it is determined in the condition satisfaction determination step that SSC entry conditions are not satisfied.

6. The SSC control method of claim 1, wherein the condition satisfaction determination step comprises one or more of the following steps: determining whether an accelerator pedal is not operated; determining whether a brake pedal is not operated; determining whether a current vehicle speed is more than a reference vehicle speed; determining whether a road angle is above a reference road slope; and determining whether a steering angle is smaller than a reference steering angle.

7. The SSC control method of claim 1, wherein the navigation information acquisition step includes obtaining turn angle information every 10 meters forward of the current vehicle position.

8. The SSC control method of claim 1, wherein the navigation information acquisition step includes obtaining turn angle information within 500 meters forward of the current vehicle position.

9. The SSC control method of claim 1, wherein the forward sudden section determination step includes determining whether a turn angle of road in a set forward distance is greater than a reference turn angle.

10. A Start/Stop Coasting (SSC) control apparatus comprising:
    a navigation system configured to acquire turn angle information of road in a set forward distance, and
    an engine;
    a transmission configured to transmit or block power of the engine to wheels; and
    an Electronic Control Unit (ECU) configured to obtain a turn angle from the navigation system, to determine whether the turn angle obtained from the navigation system is greater than a reference turn angle, and to control a vehicle to perform self-driving by using engine power when the turn angle is greater than the reference turn angle,
    wherein the engine is configured to be stopped or restarted by the ECU.

* * * * *